W. T. DOYLE.
PROCESS FOR MANUFACTURING ACID PHOSPHATE OR SUPERPHOSPHATE.
APPLICATION FILED MAR. 29, 1921.

1,401,527.

Patented Dec. 27, 1921.
2 SHEETS—SHEET 1.

Inventor
William T. Doyle
by Robt. S. Haines.
Attorney

W. T. DOYLE.
PROCESS FOR MANUFACTURING ACID PHOSPHATE OR SUPERPHOSPHATE.
APPLICATION FILED MAR. 29, 1921.

1,401,527.

Patented Dec. 27, 1921.

Inventor:
William T. Doyle
by Robt P. Harris.
Attorney

UNITED STATES PATENT OFFICE.

WILLIAM T. DOYLE, OF BOSTON, MASSACHUSETTS, ASSIGNOR TO STURTEVANT MILL COMPANY, OF BOSTON, MASSACHUSETTS, A CORPORATION OF MASSACHUSETTS.

PROCESS FOR MANUFACTURING ACID PHOSPHATE OR SUPERPHOSPHATE.

1,401,527.  Specification of Letters Patent.  Patented Dec. 27, 1921.

Application filed March 29, 1921. Serial No. 456,713.

*To all whom it may concern:*

Be it known that I, WILLIAM T. DOYLE, a citizen of the United States, residing at Boston, in the county of Suffolk and State of Massachusetts, have invented an Improvement in Processes for Manufacturing Acid Phosphate or Superphosphate, of which the following description, in connection with the accompanying drawings, is a specification, like characters on the drawings representing like parts.

This invention relates to a process for manufacturing acid phosphate or superphosphate.

One important source of this acid phosphate is in a phosphate rock which contains tribasic phosphate of lime which is insoluble in water, and consequently when applied to the soil, cannot be assimilated by plants. To render the phosphoric acid available, it is necessary to convert the insoluble phosphoric acid in phosphate rock into soluble phosphoric acid. Usually this is accomplished by treating the ground phosphate rock with surfuric acid or hydrochloric acid which removes two parts of the lime as gypsum and leaves one part of the lime combined with phosphoric acid as monobasic or acid phosphate of lime soluble in water.

The ground phosphate rock and the acid, such, for example, as diluted sulfuric acid in proportions substantially of 1,000 lbs. of each, are thoroughly mixed, and then discharged into a large chamber generally built of concrete and known as a den. The mixture is allowed to stand about twelve hours in the den, which allows the chemical reaction to take place. After a time, the mixture becomes a spongy mass which is disintegrated or broken down and then conveyed to a curing pile where it is allowed to remain a sufficient length of time for the chemical reaction to continue and further convert insoluble phosphoric acid into soluble phosphoric acid.

The above process requires feeding a batch of the mixed materials into the den, and then the feed must be interrupted to permit the materials to stand in the den for the period necessary for the chemical reaction to take place. Also, the introduction of further materials into the den cannot be commenced until after the batch of materials has been disintegrated and removed from the den. This, therefore, is an intermittent time consuming process.

An important aim and purpose of the present invention, therefore, is to provide a process for the manufacture of acid phosphate or superphosphate, in which the ground or pulverent phosphate rock and acid may be continuously mixed and delivered to a conveyer which has a predetermined travel to allow the chemical reaction to take place, in which the mixture changes from a sludge of more or less liquid form to the integral spongy form.

The present process also contemplates that this spongy integral mass may be continuously disintegrated or broken down for continuous delivery to the curing pile, where the materials remain a sufficient length of time to permit the chemical reaction to continue.

Another purpose of the process is to combine a quantity of ground phosphate rock with the sludgy mixture to increase the available phosphoric acid obtained from the mixture.

The spongy mass contains a certain percentage of free phosphoric acid which renders it damp and sticky and unfit for application to the soil in this condition, since it would clog and not pass through a drill or machine for applying the phosphates to the soil. Another purpose of the present process, therefore, is to remove vapor or moisture from the materials as the spongy mass is disintegrated, so as to render the same in sufficiently dry and pulverent condition for ready application to the soil.

The process may be practised by the use of various apparatus, but for purposes of illustration, one good form of apparatus for the practice of the process is shown in the accompanying drawings, wherein.

Figure 3:
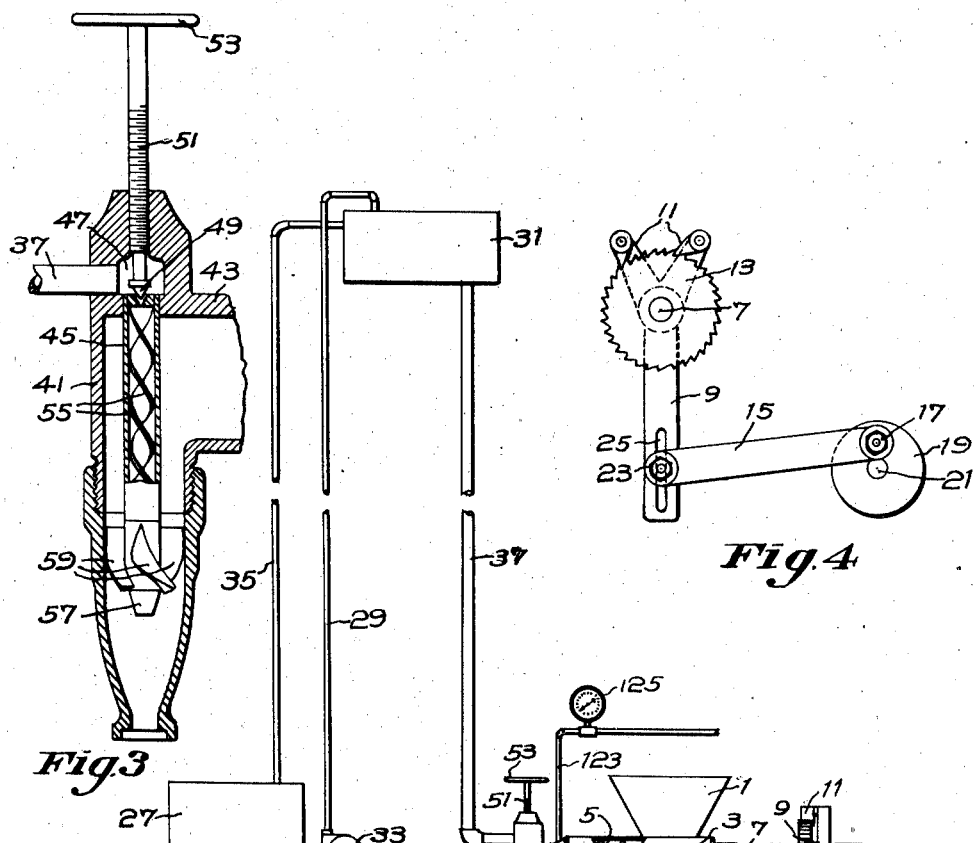
Figure 4:
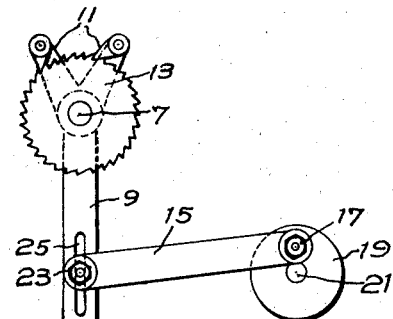

Fig. 3 on an enlarged scale is a vertical section through a nozzle which may be employed in mixing the ground phosphate rock and the acid; and Fig. 4 is a detail of a feed device to be referred to.

Referring to the drawings, the apparatus shown therein as one good form of means by which the process may be practised, comprises a hopper 1 which may continuously receive the ground or pulverent phosphate rock from any suitable source of supply, and unnecessary to disclose herein. This hopper communicates with a tube 3 containing a feed screw 5 which may be driven by any suitable means. This means, in the present instance, comprises a shaft 7 having a ratchet wheel 9 fast thereon adapted to be advanced step-by-step by pawls 11 (Fig. 4) carried by the fork 13 fulcrumed on the shaft 7, and at the upper end of an arm 9 connected by a link 15 with a wrist pin 17 on a wheel 19 mounted on a shaft 21 which may be driven by any suitable means. It is desirable that the feed may be varied. To accomplish this, in the present instance, the link 15 is adjustably connected to the arm 9 by a bolt 23 entered through an elongated slot 25 in the arm 9. By adjusting the bolt longitudinally of the slot 25, the range of rocking movement of the arm 9 may be varied, and the speed of rotation of the ratchet may be regulated.

Figure 2:
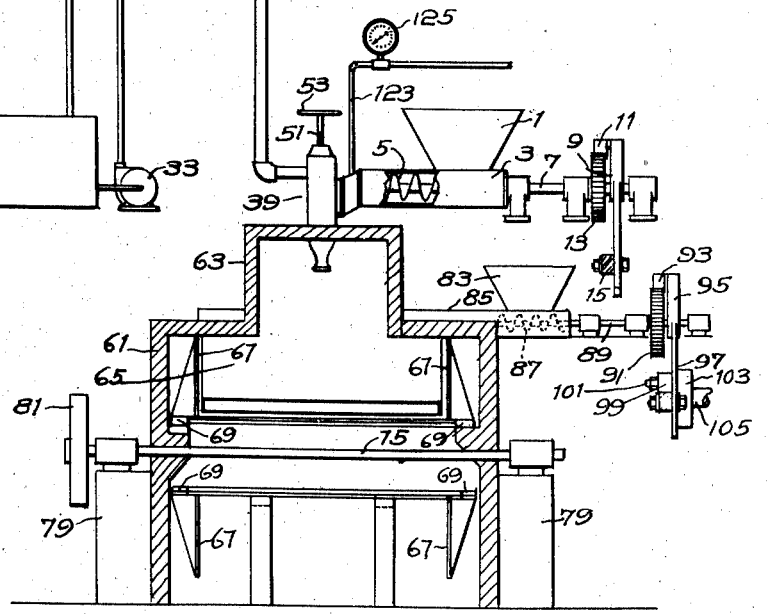
Fig. 2 is a vertical section taken on line 2—2 of Fig. 1.

Suitable means may be provided for supplying the acid which is to be mixed with the ground phosphate rock. This means, in the present instance, is in the form of a tank 27 (Fig. 2) connected by a pipe 29 with a constant level tank 31, a pump 33 being interposed in the pipe 29 for elevating the acid from the supply tank 27 to the constant level tank 31. An overflow pipe 35 leads from the upper end of the constant level tank 31 back to the supply tank 27. The construction is such that the pump will continuously supply acid to the tank 31, and the acid will overflow through the return pipe 35. As a consequence, the level of the acid in the tank 31 will automatically be maintained at a constant level with a constant head. A pipe 37 leads downward from the constant level tank 31 to a point adjacent the tube 3.

Suitable means may be provided to receive the ground phosphate rock from the tube 3, and the acid from the constant level tank 31. This means, in the present instance, is in the form of a nozzle 39 comprising a body 41 (Fig. 3) having a neck 43 connected to the delivery end of the tube 3. This body contains a tube 45 having its upper end communicating in turn with the acid supply pipe 37. The amount of acid delivered through the nozzle may be regulated by a needle valve 49 at the lower end of a stem 51 threaded into the upper end of the body 41 and provided with a hand wheel 53.

The tube 45 may have fixed spiral vanes 55 therein extending from the top of the tube to the mouth 57 at the lower end of the tube. The construction is such that as the acid passes down through the tube, the vanes promote a whirl of the acid, so that the latter issues from the mouth 57 in distributed or spray form.

The nozzle may also be provided with vanes 59 in the annular passage formed between the tube 45 and the nozzle, and desirably adjacent the acid delivery mouth 57. The construtcion is such that the ground phosphate rock will be fed from the tube 3 into the annular space in the nozzle, and will be delivered in distributed or whirling form into the path of the acid spray issuing from the mouth 57. As a consequence, the ground phosphate rock and acid will be thoroughly mixed as they are continuously fed through and delivered from the nozzle. The proportions of the ground phosphate rock and acid may be regulated by adjustment of the feeding means for the rock and the needle valve for the acid.

Figure 1:
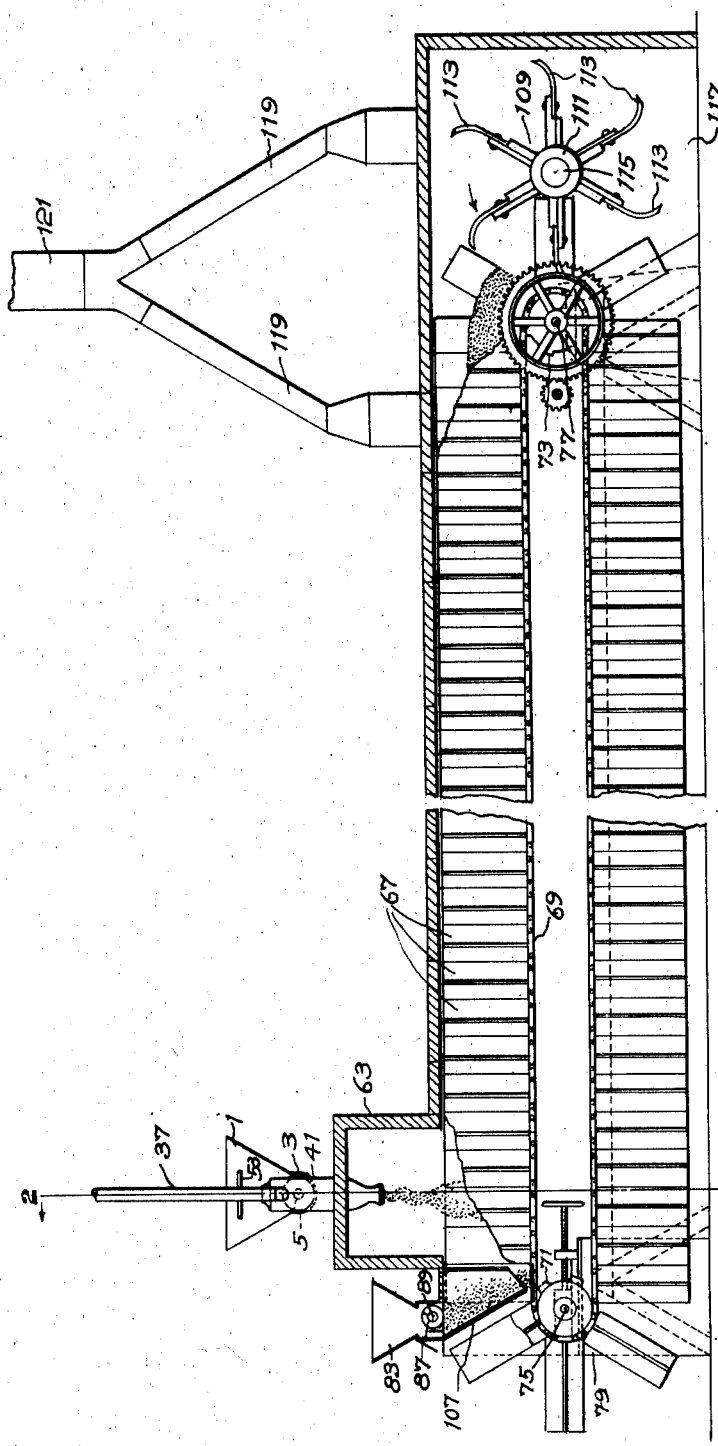
Figure 1 is a view partly in side elevation and partly in section of the apparatus.

As stated, the process of the present invention contemplates that the mixed materials may be fed by a conveyer with a travel sufficient to enable the chemical reatcion to take place, and to permit the materials to change from sludge to spongy mass form. To accomplish this, in the present instance, a casing 61 (Figs. 1 and 2) may be provided having a chamber 63 adjacent one end thereof into which the nozzle 39 projects. Mounted within the casing is a conveyer, in the present instance, in the form of a trough 65 which may be made of sections 67 secured to links of sprocket chains 69 on sprocket wheels 71 and 73 mounted on shafts 75 and 77 journaled in bearings on suitable supports 79 adjacent the casing 61. The shaft 75 may have a wheel 81 fast thereon which may be driven from any suitable source of power.

As stated, the process of the present invention contemplates that a quantity of ground phosphate rock shall be mixed with the sludge mixture of ground phosphate rock and acid. To accomplish this, in the present instance, a hopper 83 (Figs. 1 and 2) may be provided adjacent one end of the conveyer, and ground phosphate rock may be continuously supplied to this hopper by any suitable means, which need not be shown herein. The hopper 83 communicates with a tube 85 containing a feed screw 87 on a shaft 89 which may be driven by any suitable means, in the present instance, comprising a ratchet wheel 91 fast on said shaft, and pawls 93 carried by the upper ends ot a fork 95 on an arm 97 fulcrumed on the shaft 89. This arm may be connected by a link 99 with a wrist pin 101 on a wheel 103 mounted on a shaft 105 which may be driven by suitable means. This driving means for the feed screw 87 may be similar to that disclosed in Fig. 4, and described for driving the feed screw 5 referred to. An inclined plate 107 (Fig. 1) leads from the delivery end of the tube 85 down to the bottom of the trough conveyer.

The construction is such that the ground phosphate rock may be continuously fed from the hopper 83 by the feed screw 87 through the tube 85 and down the inclined plate 107 to the bottom of the trough conveyer. The materials thus introduced to the conveyer will receive the sludge mixture and desirably increase the available phosphoric acid. The ground phosphate rock thus introduced to the bottom of the trough conveyer will also form a bed in the bottom of the trough which will tend to prevent leakage of the sludge between the sections of the trough.

The sludge which is delivered from the nozzle 39 into the chamber 63 will gravitate downward into the trough conveyer, and will be continuously fed toward the delivery end thereof. The length of the conveyer and the speed thereof may be such that the materials in traveling from the feeding-in end to the delivery end of the conveyer will experience the chemical reaction which heretofore has taken place while the mixture is standing in the den. In the course of this travel, the materials will change from sludge to spongy mass form.

The process of the present invention contemplates that this mass shall be disintegrated on reaching the delivery end of the conveyer. To accomplish this, in the present instance, a cutter 109 (Fig. 1) may be provided comprising a hub 111 having curved knives 113 secured thereto, in the present instance, six such knives being shown. The hub 111 may be mounted fast on a shaft 115 which may be driven by suitable means.

The construction is such that the block or spongy mass will be slowly but continuously fed to the cutter, and the knives of the latter will come in contact with the advancing end of the mass and break down or disintegrate the same. The disintegrated materials may be delivered from the casing 61 through an outlet 117, and may be conveyed therefrom by any suitable means to the curing pile, in order that the chemical reaction may continue and the materials may be in condition for use.

Noxious fumes accompany the chemical reaction taking place as the materials travel from the feeding-in end to the delivery end of the conveyer, and the materials contain steam or moisture which should be removed. The construction of the cutter is such that it not only serves to disintegrate the materials, but also as a blower to produce a draft of air which acts on the materials as they are disintegrated and desirably aerates and dries the same. The fumes and steam may be conveyed from the casing 61 through branch chimneys 119 leading to a main chimney 121.

It may be desirable to break up the ground rock phosphate as it is fed from the feed screw containing tube 3 to the nozzle 39. This may be accomplished by compressed air which may be introduced into the tube through a pipe 123 which may receive the compressed air from a suitable air compressor unnecessary to be shown herein. The pipe 123 may be provided with a gage 125 to indicate the pressure. The construction is such that after the materials have been fed by the feed screw, the compressed air will act on the materials and prevent their packing and choking the tube and the entrance into the nozzle.

In accordance with the process which may be practised by the apparatus described, the ground phosphate rock and the acid, such, for example, as sulfuric acid are continuously mixed and continuously fed with a sufficient travel to allow time for the chemical reaction to take place which converts insoluble phosphoric acid into soluble phosphoric acid. A certain percentage of ground phosphate rock is added to the mixture, which further contributes to the available phosphoric acid. The spongy mass is continuously disintegrated and aerated, and the materials are thus continuously treated in readiness for delivery to the curing pile.

It will be understood that various deviations may be made from the process described without departing from the spirit and scope of the appended claims.

What is claimed is:—

1. A process for manufacturing acid phosphate, characterized by continuously mixing ground phosphate rock and acid, allowing a chemical reaction to take place to convert the insoluble phosphoric acid while conveying the mixture away from the mixer into soluble phosphoric acid, and disintegrating the mixture to liberate vapor therefrom.

2. A process for manufacturing acid phosphate, characterized by continuously mixing ground phosphate rock and acid, and conveying the mixture through a sufficient travel to allow a chemical reaction to take place to convert insoluble phosphoric acid into soluble phosphoric acid.

3. A process for manufacturing acid phosphate, characterized by continuously mixing ground phosphate rock and acid to form a sludge, combining the sludge with a quantity of ground phosphate rock, and moving the materials a sufficient length of time to allow the chemical reaction to take place and convert insoluble phosphoric acid into soluble phosphoric acid.

4. A process for manufacturing acid phosphate, characterized by continuously mixing ground phosphate rock and acid to form a sludge, combining the sludge with a quantity of ground phosphate rock, moving the materials a sufficient length of time to allow the chemical reaction to take place and convert insoluble phosphoric acid into soluble phosphoric acid, and continuously disintegrating the mixture to liberate vapor therefrom.

5. A process for manufacturing acid phosphate, characterized by continuously mixing ground phosphate rock and acid to form a sludge, combining the sludge with a quantity of ground phosphate rock, moving the materials a sufficient length of time to allow the chemical reaction to take place and convert insoluble phosphoric acid into soluble phosphoric acid, continuously disintegrating the mixture to liberate vapor therefrom, and continuously aerating the disintegrated materials.

6. A process for manufacturing acid phosphate, characterized by continuously feeding ground phosphate rock and acid, continuously mixing the same, continuously conveying the mixture to allow the same to change from sludge to spongy mass form, and continuously disintegrating the mixture.

7. A process for manufacturing acid phosphate, characterized by continuously mixing ground phosphate rock and acid, regulating the proportions of the mixture, continuously conveying the mixture to allow the materials to change from sludge to spongy mass form, and continuously disintegrating the mixture.

8. A process for manufacturing acid phosphate, characterized by continuously mixing ground phosphate rock and acid, moving the mixture with sufficient travel to allow a chemical reaction to take place to convert the insoluble phosphoric acid into soluble phosphoric acid, disintegrating the mixture and aerating the disintegrated materials.

9. A process for manufacturing acid phosphate, characterized by continuously feeding ground phosphate rock and acid, introducing air to the ground phosphate rock to prevent the same from compacting, mixing the ground phosphate rock and acid to form a sludge, continuously moving the mixture a sufficient length of time to allow the chemical reaction to take place to convert insoluble phosphoric acid into soluble phosphoric acid, and disintegrating the mixture to liberate vapor therefrom.

In testimony whereof I have signed my name to this specification.

WILLIAM T. DOYLE.